(12) United States Patent
Tan et al.

(10) Patent No.: US 10,606,867 B2
(45) Date of Patent: Mar. 31, 2020

(54) DATA MINING METHOD AND APPARATUS (71) Applicant: Huawei Technologies Co., Ltd., Shenzhen (CN)

(72) Inventors: Weiguo Tan, Shenzhen (CN); Fangshan Wang, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 757 days.

(21) Appl. No.: 15/337,508

(22) Filed: Oct. 28, 2016

(65) Prior Publication Data
US 2017/0046422 A1 Feb. 16, 2017

Related U.S. Application Data

(63) Continuation of application No. PCT/CN2014/087630, filed on Sep. 28, 2014.

(30) Foreign Application Priority Data

May 30, 2014 (CN) .......................... 2014 1 0239140

(51) Int. Cl.
G06F 17/30 (2006.01)
G06F 16/28 (2019.01)
G06N 20/00 (2019.01)
G06F 16/2458 (2019.01)
G06F 16/00 (2019.01)

(52) U.S. Cl.
CPC ............ G06F 16/285 (2019.01); G06F 16/00 (2019.01); G06F 16/2465 (2019.01); G06F 16/2471 (2019.01); G06N 20/00 (2019.01)

(58) Field of Classification Search
CPC .... G06F 16/00; G06F 16/285; G06F 16/2471; G06F 16/2465; G06N 20/00
See application file for complete search history.

(56) References Cited

U.S. PATENT DOCUMENTS 5,970,495 A 10/1999 Baru et al.
6,032,146 A 2/2000 Chadha et al.
(Continued)

FOREIGN PATENT DOCUMENTS

CN 101799809 A 8/2010
CN 102096602 A 6/2011
(Continued)

OTHER PUBLICATIONS

Foreign Communication From a Counterpart Application, European Application No. 14893347.6, Extended European Search Report dated Mar. 17, 2017, 9 pages.
(Continued)

*Primary Examiner* — Anhtai V Tran
(74) *Attorney, Agent, or Firm* — Conley Rose, P.C.

(57) ABSTRACT

A data mining method and apparatus where the method includes determining multiple execution steps of a data mining process, acquiring a correspondence between a physical resource required by each execution step in a running process and a physical resource occupied by input data of the data mining process, determining a node for executing each execution step, determining, according to a maximum amount of data of input data that can be processed by the node for executing each step, a maximum amount of data of input data that can be processed by the distributed system, and processing to-be-mined data in accordance with the data mining process according to the maximum amount of data of the input data that can be processed by the distributed system. The input data is accurately and effectively limited such that normal running of the system can be ensured.

18 Claims, 5 Drawing Sheets

(56) References Cited

U.S. PATENT DOCUMENTS

| | | | |
|---|---|---|---|
| 7,516,152 B2 | 4/2009 | Chitgupakar et al. | |
| 2004/0260684 A1* | 12/2004 | Agrawal | G06F 16/22 |
| 2005/0005012 A1* | 1/2005 | Odhner | G06Q 10/06 |
| | | | 709/226 |
| 2007/0299980 A1* | 12/2007 | Amini | H04L 47/10 |
| | | | 709/231 |
| 2011/0302583 A1 | 12/2011 | Abadi et al. | |

FOREIGN PATENT DOCUMENTS

| | | |
|---|---|---|
| CN | 102693317 A | 9/2012 |
| CN | 102903114 A | 1/2013 |

OTHER PUBLICATIONS

Partial English Translation and Abstract of Chinese Patent Application No. CN102903114, dated Jan. 30, 2013, 10 pages.

Mitra, P., et al., "Unsupervised feature selection using feature similarity," IEEE Transactions on Pattern Analysis and Machine Intelligence, vol. 24, No. 3, Mar. 2002. pp. 301-312.

Hall, M., "Correlation-based Feature Selection for Machine Learning," Department of Computer Science, Apr. 1999, 198 pages.

Foreign Communication From a Counterpart Application, PCT Application No. PCT/CN2014/087630, English Translation of International Search Report dated Feb. 2, 2015, 2 pages.

Foreign Communication From a Counterpart Application, PCT Application No. PCT/CN2014/087630, English Translation of Written Opinion dated Feb. 2, 2015, 5 pages.

\* cited by examiner

DATA MINING METHOD AND APPARATUS

CROSS-REFERENCE TO RELATED APPLICATIONS

This application is a continuation of International Application No. PCT/CN2014/087630, filed on Sep. 28, 2014, which claims priority to Chinese Patent Application No. 201410239140.4, filed on May 30, 2014. The disclosures of the aforementioned applications are hereby incorporated by reference in their entireties.

TECHNICAL FIELD

Embodiments of the present disclosure relate to data processing technologies, and in particular, to a data mining method and apparatus.

BACKGROUND

Data mining (DM) refers to a nontrivial process of revealing information that is implicit, previously unknown, and potentially valuable from a large amount of data in a database. DM is mainly based on artificial intelligence, machine learning, pattern recognition, statistics, a database, visualization technologies, and the like, analyzes enterprise data in a highly automated manner, makes an inductive inference, and mines for a potential pattern of the enterprise data, to help a decider to adjust a marketing strategy, reduce risks, and make a correct decision.

However, with the arrival of the age of big data, sources of objects on which data mining is performed are increasingly extensive, and consequently, a quantity of samples and/or a quantity of feature columns in a data set reaches a very large scale. In the prior art, after feature column selection is performed and if there are excessive selected feature columns, a problem of resource insufficiency such as a memory shortage occurs in which causes a failure in execution of a data mining process.

SUMMARY

Embodiments of the present disclosure provide a data mining method and apparatus, to overcome a failure in execution of a data mining process because of a physical resource shortage in the data mining process.

According to one aspect, an embodiment of the present disclosure provides a data mining method, where the method is applied to a distributed system, the distributed system includes at least one node, and the method includes determining multiple execution steps of a data mining process, acquiring a correspondence between a physical resource required by each execution step in a running process and a physical resource occupied by input data of the data mining process, determining a node for executing each execution step, where the node is a node that provides a physical resource for each execution step, determining, according to the correspondence and a physical resource possessed by a node for executing a corresponding execution step, a maximum amount of data of the input data that can be processed by the node for executing each step, determining, according to the maximum amount of data of the input data that can be processed by the node for executing each step, a maximum amount of data of input data that can be processed by the distributed system, and processing to-be-mined data in accordance with the data mining process according to the maximum amount of data of the input data that can be processed by the distributed system.

According to another aspect, an embodiment of the present disclosure provides a data mining apparatus, where the apparatus includes a transceiver, a processor, and a memory. The transceiver is configured to receive an original data set, and send to-be-processed input data obtained through extraction to each node for processing. The memory is configured to store the original data set. The processor is configured to determine multiple execution steps of a data mining process, acquire a correspondence between a physical resource required by each execution step in a running process and a physical resource occupied by input data of the data mining process, determine a node for executing each execution step, where the node is a node that provides a physical resource for each execution step, determine, according to the correspondence and a physical resource possessed by a node for executing a corresponding execution step, a maximum amount of data of the input data that can be processed by the node for executing each step, determine, according to the maximum amount of data of the input data that can be processed by the node for executing each step, a maximum amount of data of input data that can be processed by the distributed system, and process to-be-mined data in accordance with the data mining process according to the maximum amount of data of the input data that can be processed by the distributed system.

According to the embodiments of the present disclosure, a relationship between a property of a data mining process and a physical resource possessed by a network node in a data mining process and a distributed network system is comprehensively evaluated in order to obtain a maximum amount of data that can be supported in the distributed network system to run the data mining process, and input data is accurately and effectively limited such that normal running of the system can be ensured.

BRIEF DESCRIPTION OF DRAWINGS

To describe the technical solutions in the embodiments of the present disclosure more clearly, the following briefly describes the accompanying drawings required for describing the embodiments.

DESCRIPTION OF EMBODIMENTS

To make the objectives, technical solutions, and advantages of the embodiments of the present disclosure clearer, the following clearly describes the technical solutions in the embodiments of the present disclosure with reference to the accompanying drawings in the embodiments of the present disclosure. The described embodiments are some but not all of the embodiments of the present disclosure. All other embodiments obtained by persons of ordinary skill in the art based on the embodiments of the present disclosure without creative efforts shall fall within the protection scope of the present disclosure.

Figure 1:
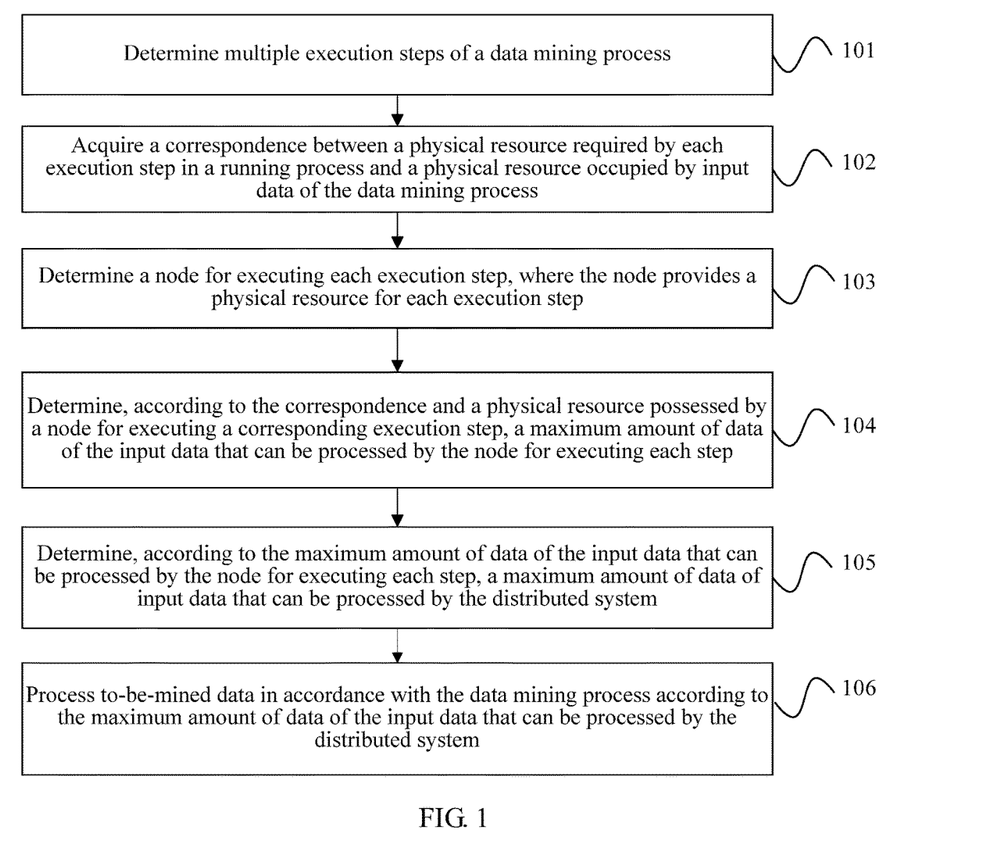
FIG. 1 is a flowchart of Embodiment 1 of a data mining method according to the present disclosure.

FIG. 1 is a flowchart of Embodiment 1 of a data mining method according to the present disclosure. This embodiment may be executed by a general data mining apparatus, and the data mining apparatus may be implemented by general software and/or hardware. The data mining method in this embodiment is applied to a distributed architecture, where the distributed architecture includes at least one node, and the node may be a common personal computer (PC), a virtual machine in a server in a cloud architecture, or another computing resource that can be used in the distributed architecture. As shown in FIG. 1, the method in this embodiment may include the following steps.

Step 101: Determine multiple execution steps of a data mining process.

A manner for determining the multiple execution steps of the data mining process may be parsing the data mining process by a data mining apparatus, or acquiring, by a data mining apparatus, from a storage apparatus that stores the execution steps of the data mining process.

The acquisition manner that parsing the data mining process may be dividing the data mining process according to different algorithm principles used in different phases of the data mining process, or using a phased processing result obtained in the data mining process as a division basis, or dividing the data mining process according to a logical step of the data mining process, where the logical step is generally set during study and design of the data mining process, and is generally strongly associated with a processing phase. The foregoing parsing methods are simple examples of manners that can be covered by the present disclosure, and do not particularly limit a range that can be covered by the present disclosure.

Step 102: Acquire a correspondence between a physical resource required by each execution step in a running process and a physical resource occupied by input data of the data mining process.

The correspondence is preferably a ratio parameter of the physical resource required by each execution step in the running process to the physical resource occupied by the input data of the data mining process.

Step 103: Determine a node for executing each execution step, where the node provides a physical resource for each execution step.

A relationship between nodes that provide a physical resource for each execution step includes that a same node provides a physical resource for multiple execution steps, multiple nodes jointly provide a physical resource for one execution step, multiple nodes provide a physical resource for multiple execution steps, and the like.

In this step, preferably, the data mining apparatus acquires in advance a situation of all nodes or available nodes in a distributed system, for example, which nodes are idle, which nodes may be used in combination, and even a historical running record of an execution step on a node. Generally, a running situation of each node is managed by a management apparatus in the distributed system, and the data mining apparatus may directly acquire a distribution situation and a capability attribute of each node from the management apparatus.

Step 104: Determine, according to the correspondence and a physical resource possessed by a node for executing a corresponding execution step, a maximum amount of data of input data that can be processed by the node for executing each step.

The correspondence between a physical resource required by each execution step in a running process and a physical resource occupied by input data of the data mining process is already obtained in step 102. Therefore, after the node that provides a physical resource for each execution step is further determined in step 103, in each execution step, calculation is performed according to a physical resource possessed by a corresponding node, to obtain a maximum amount of data that is allowed to be input in a corresponding single execution step in the data mining process.

Step 105: Determine, according to the maximum amount of data of the input data that can be processed by the node for executing each step, a maximum amount of data of input data that can be processed by the distributed system.

In step 104, multiple maximum amounts of data that are separately allowed to be input in the execution steps in the data mining process are obtained, and the maximum amount of data that the distributed system allows to input is a minimum value of the multiple maximum amounts of input data. A principle thereof is similar to the short plank law, and the distributed system can normally run only when an amount of input data is less than the minimum value of the maximum amounts of data that can be processed in the execution steps.

Step 106: Process to-be-mined data in accordance with the data mining process according to the maximum amount of data of the input data that can be processed by the distributed system.

According to this embodiment of the present disclosure, a relationship between a property of a data mining process (including execution steps included in the data mining process and a relationship between each execution step and a node for running the execution step) and a physical resource possessed by a network node in a distributed network system is comprehensively evaluated in order to obtain a maximum amount of data that can be supported in the distributed network system to run the data mining process, and input data is accurately and effectively limited such that normal running of the system can be ensured.

Persons skilled in the art may understand that, the given data mining process may be any known data mining process, and what needs to be done in the present disclosure is how to analyze the data mining process, and use a physical resource possessed by each node in the distributed system in order to correspondingly limit and optimize input data. The data mining process is not limited herein in this embodiment.

In the interpretation of step 101, a related method for determining multiple execution steps of a data mining process is disclosed. A process for determining a data mining process is described in detail below with reference to a specific data mining process.

Figure 2:
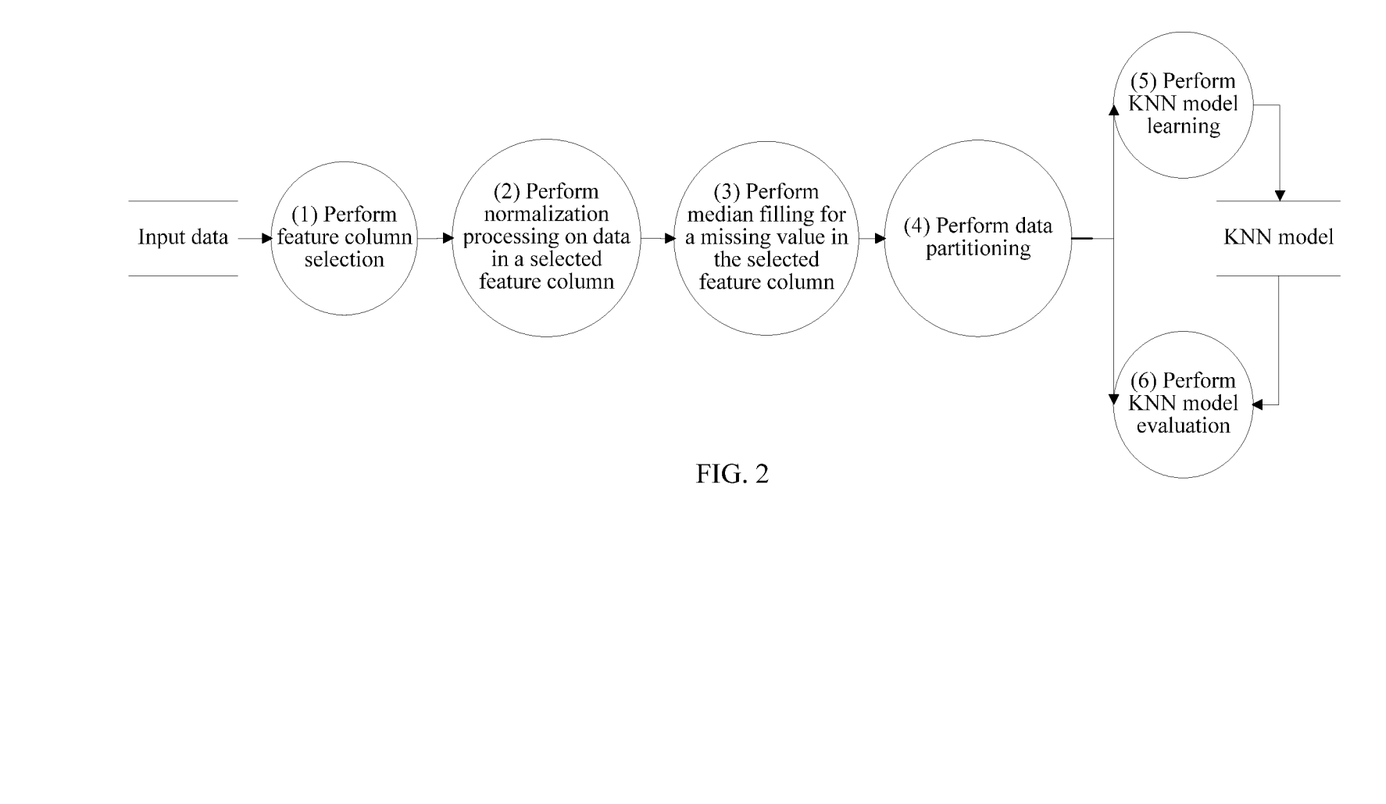
FIG. 2 is a schematic diagram of a data mining process illustrated in the present disclosure.

Referring to FIG. 2, FIG. 2 is a schematic diagram of a data mining process illustrated in the present disclosure. The data mining process in this embodiment is merely exemplary, and for another data mining process, execution steps may also be acquired by applying the method in the present disclosure based on content disclosed in this embodiment. As shown in FIG. 2, the data mining process includes the following execution steps.

Step (1): Perform feature column selection. The step (1) means selecting a feature column from input data, a subsequent process runs only on the selected feature column, and other feature columns are no longer involved in analysis in subsequent steps. Persons skilled in the art may understand that, there is a target column in feature columns, and the target column is required to be a data column most relevant to a problem to be resolved by the data mining.

Feature selection herein is an operation step in the illustrated data mining process, and an objective of feature column selection is to achieve higher execution efficiency. Feature column extraction involved in a specific method in the present disclosure is considered from a limitation to a maximum amount of data that is allowed to be input by a distributed system, and objectives and meanings of the feature selection herein and the feature column extraction involved in the specific method are different. However, in an optional solution, when the execution steps of the data mining process include feature column selection, an execution step of feature column selection during data mining may be combined with feature column selection in the data mining method provided by the present disclosure. For example, step (1) is combined into step 404 as one step for processing.

Table 1 is used as an instance of the input data of the data mining process.

TABLE 1

| User identifier (ID) | Age | On-net duration | Quantity of times of Internet accesses | Short message service (SMS) message transmission amount | Call duration | ... | Already off-net |
|---|---|---|---|---|---|---|---|
| 1 | 35 | 10 | 25 | 10 | 300 | ... | 0 |
| 2 | 26 | 1 | 40 | 25 | 80 | ... | 1 |
| 3 | 41 | 15 | 3 | 2 | 180 | ... | 0 |
| ... | | | | | | | |

When a problem to be resolved is to identify a user having an off-net tendency, the target column is preferably a data column of "already off-net".

Step (2): Perform normalization processing on data in a selected feature column. The step (2) means normalizing a feature value in the feature column to between 0 and 1. For example, an original value range of ages is 0 to 100, and a value of each age is divided by 100 to obtain a normalization result of data in the feature column.

Step (3): Perform median filling for a missing value in the selected feature column. The step (3) means that, if a value of a sample in a feature column of the input data is empty, to avoid affecting a subsequent process, the empty position is filled with a median. For example, an age of a user sample is empty, and a median 50 of 0 and 100 is filled.

Step (4): Perform data partitioning. The step (4) means that half data that is processed in steps (1), (2), and (3) is used as input data of step (5), and the other half of the data is used as input data of step (6).

Step (5): Perform K-nearest neighbor (KNN) model learning. Half data rows partitioned in step (4) are used as input to perform KNN model learning. A KNN model is output after step (5) is executed, where the KNN model is main output of the entire data mining process.

Step (6): Perform KNN model evaluation. In the step (6), the KNN model that is output in step (5) is used as input, and KNN model evaluation is performed on the data obtained through partitioning in step (4). In step (6), parameters such as an accuracy rate and a recall rate of the KNN model are obtained.

Preferably, in the foregoing execution steps, the data mining process shown in FIG. 2 is parsed, and multiple execution steps for executing the data mining process are obtained, which are shown in Table 2.

TABLE 2

| First set of execution steps | Input of an execution step | Output of the execution step |
|---|---|---|
| (1) Feature column selection | Input data | Result of feature column selection |
| (2) Normalization | Result of feature column selection | Result of normalization |
| (3) Missing value filling | Result of normalization | Result of missing value filling |
| (4) Data partitioning | Result of missing value filling | Result (two parts of data, which are respectively recorded as D1 and D2) of data partitioning |
| (5) KNN model learning | Result D1 of data partitioning | KNN model |
| (6) KNN model evaluation | Result D2 of data partitioning, KNN model | Result of model evaluation |

It can be known from Table 2 that, in this embodiment, parsing the data mining process is a manner of determining multiple execution steps for executing the data mining process. The six execution steps are obtained in a relatively simple parsing manner, and the six execution steps obtained by means of parsing are referred to as a first set of execution steps in a subsequent embodiment. The first set of execution steps of the data mining process may be acquired by selecting another manner in practice. For example, a correspondence between the data mining process and a corresponding first set of execution steps is directly recorded in the distributed system.

In this embodiment of the present disclosure, the foregoing first set of execution steps can be directly used to execute subsequent steps 102 to 106. In addition, a method for performing optimization processing on the first set of execution steps is provided.

Process data generated in the multiple execution steps (the first set of execution steps) is analyzed, which includes an execution step in which the process data is generated is combined with the execution step in which the process data is used as input into an optimized execution step when there is one execution step in which the process data is used as input data, and the input data of the determined execution step does not include other process data except the process data. The process data is further represented as input data or output data of a specific step in Table 2. The determining condition for determining combination of two execution steps is also applicable to combination of more than two execution steps in a series relationship. For ease of description, in the embodiments of the present disclosure, process data between at least two combined execution steps is referred to as temporary data. For example, after steps (1), (2), and (3) are combined, process data between step (1) and step (2) may be referred to as temporary data, and process data between step (2) and step (3) may also be referred to as temporary data.

A set of execution steps formed by the original execution steps in the first set of execution steps and the optimized execution step is also referred to as a second set of execution steps, which is shown in Table 3 below.

pied by the execution step, thereby improving node utilization. After execution step optimization is performed, a physical resource of a node can be more effectively used, and larger input data can be processed.

With reference to the execution steps of Table 2, except KNN model learning and KNN model evaluation, all process data generated by the other execution steps satisfies the foregoing requirement of combining execution steps. An optimization principle of the foregoing execution steps is further analyzed as follows.

Each of execution steps (1), (2), and (3) in Table 2 is an operation on a sample on a single row, and rows are independent of each other. Therefore, operations of (1), (2), and (3) may be successively performed on data on each row, and only one piece of process data is output instead of outputting one piece of temporary data in each execution step. The output data of execution step (4) is not completely used as input of execution step (5) or execution step (6), that is, process data generated in execution step (4) cannot be directly deleted after being used as the input data of step (5) or step (6), and can be deleted after the process data is used in both step (5) and step (6). Therefore, execution step (4) cannot be combined with execution step (5) or execution step (6) into one execution step.

Through the foregoing specific analysis, a basis, on which execution steps are combined may be concluded from another perspective, and includes acquiring the multiple execution steps for executing the data mining process, and analyzing process data generated in the multiple execution steps, and when it is determined that in two or more than two consecutive execution steps, a unit processed each time is a single sample, combining the two or more than two execution steps.

A constitution of an amount of data of an original data set is jointly determined by a quantity of samples included and a quantity of feature columns included by a sample. Therefore, when combination of the foregoing execution steps is determined based on a property of process data between the execution steps (that is, it is determined that there is one execution step in which the process data is used as input data, and the input data of the determined execution step

TABLE 3

| Second set of execution steps | Execution step | Input of the execution step | Output of the execution step |
|---|---|---|---|
| 1 | (1) Feature column selection<br>(2) Normalization<br>(3) Missing value filling | Input data | Result (recorded as T1) obtained after feature column selection, normalization, and missing value filling are successively performed on the input data |
| 2 | (4) Data partitioning | Result T1 of missing value filling | Result (two parts of data, which are respectively recorded as T2 and T3) of data partitioning |
| 3 | (5) KNN model learning | Result T2 of data partitioning | KNN model (recorded as T4) |
| 4 | (6) KNN model evaluation | Result T3 of data partitioning, KNN model T4 | Result (recorded as T5) of model evaluation |

The inventor analyzes an association between process data and execution steps in the data mining process, and combines an execution step in which the temporary data is generated with an execution step in which the temporary data is used as input in order to prevent space occupied by the temporary data from being calculated into space occudoes not include other process data except the process data), the input data is preferably limited within a range of a determined maximum amount of data in a manner of feature column extraction, and the input data is preferably limited within a range of a determined maximum amount of data in a manner of controlling a total quantity of samples when combination of the foregoing execution steps is determined based on that a unit processed in an execution step is a single sample.

Persons skilled in the art may understand that, multiple execution steps do not need to be combined into one execution step when temporary data is not generated in the execution steps in the data mining process, and multiple execution steps finally obtained for processing in step 102 are shown in Table 2 if temporary data is not generated in the execution steps in Table 2.

In a specific implementation process, regardless of in which manner the multiple execution steps are acquired, and regardless of the first set of execution steps or the second set of execution step enters step 102, step implementation principles for subsequent steps 102 to 104 are the same. In this embodiment, for ease of description, a description is provided in detail using the second set of optimized execution steps shown in Table 3 as an example.

The node in a distributed architecture in this embodiment may be a computer, a server, a virtual machine, or the like. The physical resource in this embodiment may be a processor core, a hard disk, a memory, or the like, which may be further shown in Table 4. Table 4 shows that a distributed system includes two nodes. In a specific implementation process, a quantity of nodes in the distributed system in this embodiment may be specified according to a specific environment, and is not limited herein.

TABLE 4

|  | Processor core | Hard disk | Memory |
| --- | --- | --- | --- |
| Node 1 | Eight cores | 500 gigabytes (GB) | 4 GB |
| Node 2 | 12 cores | 1 terabyte (TB) | 8 GB |

In step 102, the correspondence between a physical resource required by each execution step in a running process and a physical resource occupied by input data of the data mining process is acquired. Further, for any execution step of the multiple execution steps for executing the data mining process, for each execution step of the multiple execution steps, a ratio of all physical resources occupied by input data and output data of the execution step to the physical resource occupied by the input data of the data mining process when the execution step is running is determined. The ratio is a specific manifestation of the correspondence.

In a specific implementation process, the memory is more likely to become a bottleneck for feature column quantity selection. Therefore, all the following analyses are performed using the memory as an example. According to experience, estimation of a central processing unit (CPU), a hard disk, and another cluster resource and impact on feature column quantity selection may be further considered based on a memory instance, or may be separately considered in a manner similar to memory analysis, and details are not described herein.

The foregoing ratio parameter may be preset according to an empirical value, or may be instantly obtained through calculation using an execution step. To describe a subsequent process more clearly, in this embodiment, Table 5 lists an instance of a proportional relationship between a memory Ti occupied by input data and a memory To occupied by output data in the data mining process in each execution step, and specific meanings of T1 to T4 are shown in Table 3.

TABLE 5

|  | To/Ti |
| --- | --- |
| T1 | 0.9 |
| T2 | 0.45 |
| T3 | 0.45 |
| T4 | 0 |

Output data represented by T4 is a result of model evaluation, and generally includes several indicators such as an accuracy rate and a recall rate. Therefore, an occupied memory may be ignored, and the result of model evaluation is not mentioned below again. It should be noted that, Table 5 provides a proportional relationship between occupied resources Ti and To of the second set of optimized execution steps that is corresponding to Table 3.

Persons skilled in the art may understand that, in a normal data mining process, to-be-processed input data is set to M. Therefore, a ratio of the physical resource required by each execution step in a running process to the physical resource occupied by the input data of the data mining process is acquired, which is shown in Table 6.

TABLE 6

| Execution step | Input data of an execution step | Output data of the execution step | Input data + output data of the execution step |
| --- | --- | --- | --- |
| 1 | M | 0.9M | M + 0.9M |
| 2 | 0.9M | 0.45M + 0.45M | 0.9M + 0.45M + 0.45M |
| 3 | 0.45M | 0.45M | 0.45M + 0.45M |
| 4 | 0.45M + 2 × 0.45M | 0 | 0.45M + 2 × 0.45M |

Because the physical resource required by each execution step in the running process includes a physical resource occupied by input data of the execution step and a physical resource occupied by output data of the execution step, where (input data of an execution step+output data of the execution step)/M is the ratio of the physical resource required by each execution step in the running process to the physical resource occupied by the input data of the data mining process.

When the execution step is an optimized execution step, and a physical resource occupied by process data generated in the optimized execution step is larger than input data and/or output data of the optimized execution step, acquiring a correspondence between a physical resource required by each execution step in a running process and a physical resource occupied by input data of the data mining process includes performing summation calculation according to two larger ratios in three ratios of the physical resource occupied by the process data, a physical resource occupied by the input data of the optimized execution step, and a physical resource occupied by the output data of the optimized execution step respectively to the physical resource occupied by the input data of the data mining process, to obtain a ratio parameter of a physical resource required by the optimized execution step in a running process to the physical resource occupied by the input data of the data mining process. For example, if a size of temporary data generated between step (1) and step (2) is 1.2M, a ratio of a physical resource required when the execution step 1 is running to the physical resource occupied by the input data of the data mining process is (1.2M+M):M=2.2:1.

In step 103, the node for executing each execution step is determined, where the node provides a physical resource for each execution step.

This embodiment of the present disclosure is applied to a distributed architecture, and physical resources required by the second set of execution step 1 to execution step 4 in Table 3 may be stored and processed on nodes in the distributed architecture in a distributed manner. Therefore, the physical resource possessed by the node and provided for the execution step determines a maximum amount of data that can be processed in each execution step.

In step 104, the maximum amount of data of the input data that can be processed by the node for executing each step is determined according to the correspondence and a physical resource possessed by a node for executing a corresponding execution step.

For example, the distributed architecture includes two nodes, and sizes of physical resources possessed by the two nodes are respectively recorded as M1 and M2.

For data in Table 5, when a physical resource required by execution step 1 may be provided by two nodes in a shared manner, M+0.9M<M1+M2 is satisfied, and when the KNN model in execution step 4 needs to be stored by both nodes, that is, a physical resource required by execution step 4 cannot be provided by the two nodes in a shared manner, 0.45M+2×0.45M<M1+M2, 0.45M<M1, and 0.45M<M2 are all satisfied. For execution step 2 and execution step 3, corresponding inequalities 0.9M+0.45 M+0.45M<M1+M2 and 0.45M+0.45M<M1+M2 may be obtained similarly.

In step 105, the maximum amount of data of the input data that can be processed by the distributed system is determined according to the maximum amount of data of the input data that can be processed by the node for executing each step.

M<A may be solved according to limitation conditions that satisfy all of the corresponding inequalities of the foregoing execution steps. Therefore, A is the maximum amount of data of the input data that can be processed in the data mining process.

In step 106, the to-be-mined data is processed in accordance with the data mining process according to the maximum amount of data. Further, to-be-processed input data extracted from the original data set is less than or equal to the maximum amount of data. Preferably, sizes of several pieces of to-be-processed input data of a saturation level, a common level, and an optimum level may be correspondingly set respectively based on different levels such as 80%, 60%, and 50% of the maximum amount of data such that a user can determine appropriate to-be-processed input data according to the levels.

In a specific application environment of this embodiment shown in FIG. 2, the to-be-processed input data is used as input of the data mining process, the data mining process is executed to obtain a data mining model, and an effect of the data mining model is verified, evaluated, and the like.

According to the data mining method provided by this embodiment of the present disclosure, a maximum amount of data of input data that can be processed is determined according to a ratio of a physical resource required by each execution step in a running process in a data mining process to a physical resource occupied by input data of the data mining process, and a physical resource possessed by each node, providing a physical resource for the data mining process, in a distributed system, and to-be-processed input data is extracted from an original data set according to the maximum amount of data. For data mining of big data, the maximum amount of data that can be processed in the data mining process can be determined under the constraint of limited physical resources, thereby ensuring that a data mining task is effectively implemented.

Figure 3:
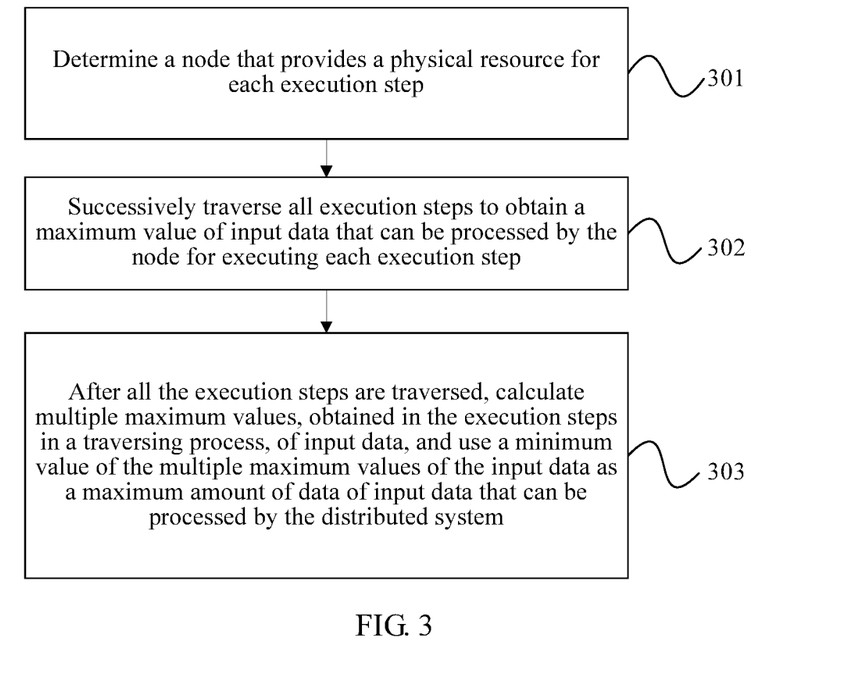
FIG. 3 is a flowchart of Embodiment 2 of a data mining method according to the present disclosure.

FIG. 3 is a flowchart of Embodiment 2 of a data mining method according to the present disclosure. This embodiment is based on Embodiment 1 of FIG. 1, and steps 103 and 104 are described in detail. In a specific implementation process, the data mining process shown in FIG. 2 and the second set of execution steps that is shown in Table 3 and that is obtained after step optimization processing is implemented are still used as an example, and physical resources required by the execution steps in a running process are provided by multiple nodes in a distributed architecture in a shared manner. The method further includes the following steps.

Step 301: Determine a node that provides a physical resource for each execution step.

Step 302: Successively traverse all execution steps to obtain a maximum value of input data that can be processed by the node for executing each execution step.

One or more nodes that provide a physical resource for a traversed execution step are determined, and a maximum value of data that can be input on the one or more nodes in the execution step is obtained through calculation according to a ratio parameter of a physical resource possessed by the one or more nodes to the execution step.

Step 303: After all the execution steps are traversed, calculate multiple maximum values, obtained in the execution steps in a traversing process, of input data, and use a minimum value of the multiple maximum values of the input data as a maximum amount of data of input data that can be processed by the distributed system.

In step 302, a description is provided using execution step 1 as an example. Further, according to a ratio parameter between a physical resource required by the execution step in a running process and a physical resource occupied by to-be-processed input data equals (M+0.9M)/M=1.9, and physical resources of nodes M1 and M2 are respectively 4 GB and 8 GB, and then a maximum amount of data of input data that can be processed in execution step 1 equals (4+8)/1.9=6.32 GB. Implementation processes of execution steps 2 and 3 are similar. The maximum amount of data of the input data that can be processed by the distributed system to run the data mining process is determined below with reference to Table 7 and with reference to a physical resource possessed by each node in the distributed system.

TABLE 7

| Execution step | Input data + output data of the execution step | Expression |
| --- | --- | --- |
| 1 | M + 0.9M | M + 0.9M < M1 + M2 |
| 2 | 0.9M + 0.45M + 0.45M | 0.9M + 0.45M + 0.45M < M1 + M2 |
| 3 | 0.45M + 0.45M | 0.45M + 0.45M < M1 + M2 |
| 4 | 0.45M + 2 × 0.45M | 0.45M + 2 × 0.45M < M1 + M2; 0.45M < M1; 0.45M < M2 |

For execution step 1, M+0.9M<M1+M2, for execution step 2, 0.9M+0.45M+0.45M<M1+M2, and for execution step 3, 0.45M+0.45M<M1+M2. In execution step 4, 0.45M+2×0.45M<M1+M2, and a physical resource required by input data of the execution step is smaller than a physical resource possessed by each node in the distributed architecture, that is, 0.45M<M1 and 0.45M<M2, where 0.45M corresponds to input data T4. A value range of M is determined according to the expressions in Table 7. It is assumed that M1=4 GB and M2=8 GB, both of which are substituted into the expressions in Table 7, and a minimum value situation in the ideal values M<6.31 GB may be calculated, that is, the maximum amount of data of the input data that can be processed is 6.31 GB.

According to the data mining method provided by this embodiment, for data mining of big data, a maximum amount of data that can be processed in a data mining process can be determined under the constraint of limited physical resources, thereby ensuring that a task is effectively implemented.

Figure 4:
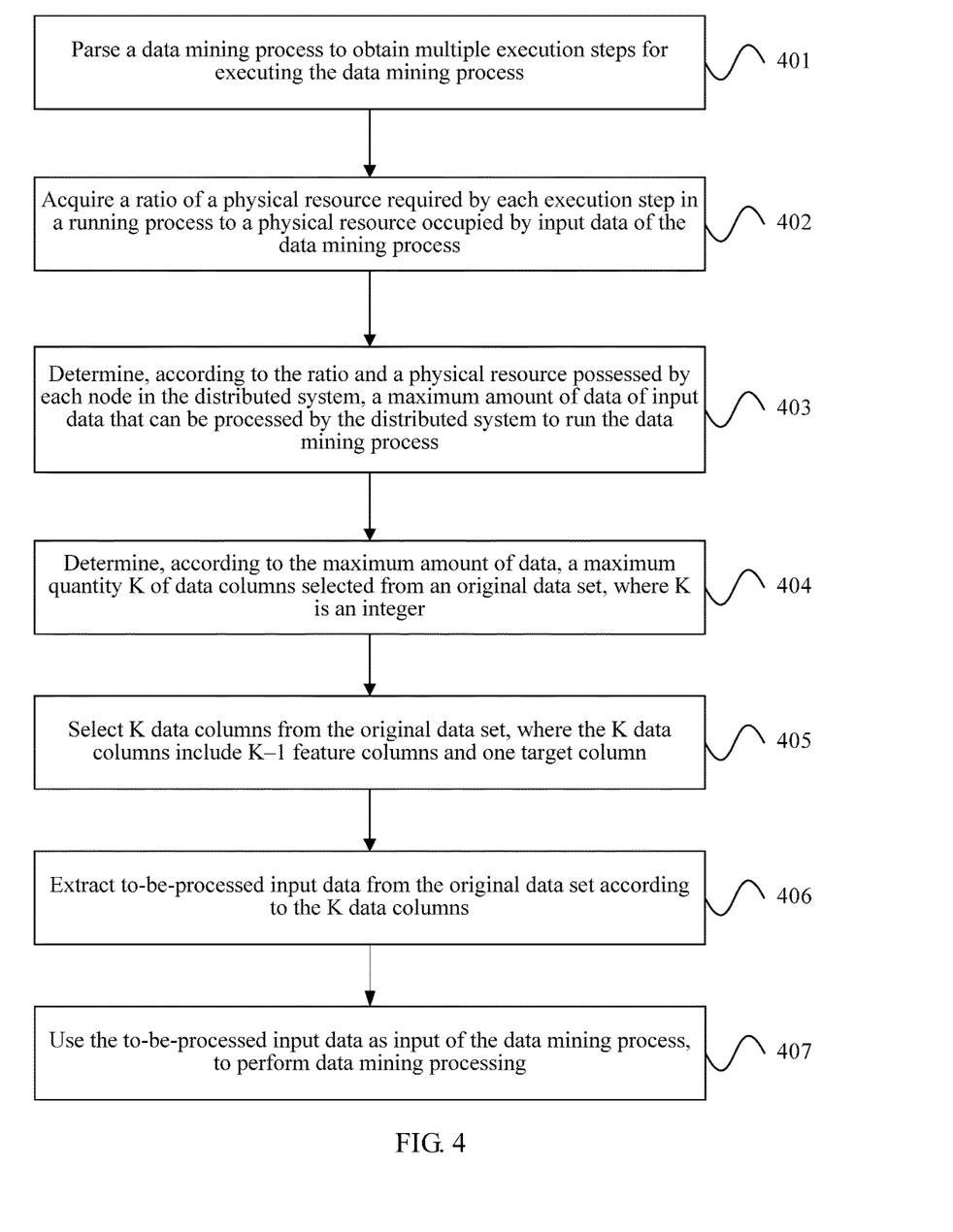
FIG. 4 is a flowchart of Embodiment 3 of a data mining method according to the present disclosure.

FIG. 4 is a flowchart of Embodiment 3 of a data mining method according to the present disclosure. This embodiment is implemented based on the embodiments of FIG. 1 and FIG. 3, and includes the following steps.

Step 401: Parse a data mining process to obtain multiple execution steps for executing the data mining process.

Step 402: Acquire a ratio of a physical resource required by each execution step in a running process to a physical resource occupied by input data of the data mining process.

Step 403: Determine, according to the ratio and a physical resource possessed by each node in the distributed system, a maximum amount of data of input data that can be processed by the distributed system to run the data mining process.

Step 404: Determine, according to the maximum amount of data, a maximum quantity K of data columns selected from an original data set, where K is an integer.

Step 405: Select K data columns from the original data set, where the K data columns include K−1 feature columns and one target column.

Step 406: Extract to-be-processed input data from the original data set according to the K data columns.

Step 407: Use the to-be-processed input data as input of the data mining process, to perform data mining processing.

Steps 401 to 403 in this embodiment are respectively similar to steps 101 to 105, and details are not described herein again in this embodiment. A specific implementation process of step 403 in this embodiment may be executed according to the embodiment of FIG. 3, and details are not described herein again.

For step 404, the maximum quantity K of data columns selected from the original data set is determined according to the maximum amount of data. Further, the maximum quantity K of the selected data columns is determined according to the maximum amount of data, a row quantity of the original data set, and a physical resource occupied by a data column. For example, the result of the foregoing Embodiment 2 is used again, and it is known that M<6.31 GB. The original data set has 10,000,000 rows. It is assumed that each data column occupies eight bytes of memory, and the maximum amount K of data=6.31*10$^9$/(10$^7$*8)=78. That is, a maximum of 78 data columns are selected from the original data set such that it can be ensured that operation of each node does not exceed maximum available memory.

In step 405, the K data columns are selected from the original data set, where the K data columns include K−1 feature columns and one target column.

In this embodiment, there are two possible implementation manners for step 405, and implementing the two possible implementation manners, further includes acquiring a first correlation coefficient between any two feature columns in the original data set, where the first correlation coefficient is greater than or equal to 0 and is less than or equal to 1, and a correlation between any two feature columns is directly proportional to a value of the first correlation coefficient, and acquiring a second correlation coefficient between any feature column and the target column in the original data set, where the second correlation coefficient is greater than or equal to 0 and is less than or equal to 1, and a correlation between any feature column and the target column is directly proportional to a value of the second correlation coefficient.

Further, for ease of description, how to calculate the first correlation coefficient and the second correlation coefficient is described herein using a small data set as an example. The specific small data set is shown in Table 8.

TABLE 8

| Age | On-net duration | Quantity of times of Internet accesses | Already off-net |
| --- | --- | --- | --- |
| 35 | 10 | 25 | 0 |
| 26 | 1 | 40 | 1 |
| 41 | 15 | 3 | 0 |

The column of "already off-net" is the target column (1 indicates being already off-net, and 0 indicates being not off-net), and the other columns are feature columns.

Each feature column may be regarded as a vector, a dimension of the vector is a quantity of samples of the original data set, and values in the vector are values of all samples on the feature column in the original data set. The target column may also be regarded as a vector, and values in the vector are values of all samples on the target column.

A correlation coefficient between vectors $a=<a_1, a_2, \ldots, a_n>$ and $b=<b_1, b_2, \ldots, b_n>$ may be calculated using a cosine similarity, and a formula is as follows:

$$Corr(a, b) = \frac{\left|\sum_{i=1}^{n}(a_i * b_i)\right|}{\sqrt{\sum_{i=1}^{n} a_i^2 \times \sum_{i=1}^{n} b_i^2}}. \quad (1)$$

A value range of the correlation coefficient is [0,1], a correlation between the vectors is higher if the correlation coefficient is closer to 1, and the correlation between the vectors is lower if the correlation coefficient is closer to 0.

According to the foregoing formula (1), a correlation coefficient between the age and the on-net duration is:

$$\frac{35*10 + 26*1 + 41*15}{\sqrt{(35^2 + 26^2 + 41^2) \times (10^2 + 1^2 + 15^2)}} = 0.917.$$

A correlation coefficient between each feature column and the target column ("already off-net") may also be calculated using the same method.

To improve performance, a correlation coefficient between every two features and a correlation coefficient between a feature column and the target column may be calculated using matrix multiplication.

For example, data in Table 8 may be expressed as a matrix:

$$A = \begin{bmatrix} 35 & 10 & 25 & 0 \\ 26 & 1 & 40 & 1 \\ 41 & 15 & 3 & 0 \end{bmatrix}.$$

Then, matrix multiplication $A^T * A$ is calculated, where $A^T$ is a transposed matrix of A, and the following is obtained:

$$A^T A = \begin{bmatrix} 35 & 26 & 41 \\ 10 & 1 & 15 \\ 25 & 40 & 3 \\ 0 & 1 & 0 \end{bmatrix} \begin{bmatrix} 35 & 10 & 25 & 0 \\ 26 & 1 & 40 & 1 \\ 41 & 15 & 3 & 0 \end{bmatrix} = \begin{bmatrix} 3582 & 991 & 2038 & 26 \\ 991 & 326 & 335 & 1 \\ 2038 & 335 & 2234 & 40 \\ 26 & 1 & 40 & 1 \end{bmatrix}.$$

An off-diagonal element of the matrix is actually a denominator part $$\sum_{i=1}^{n} (a_i * b_i)$$

of formula (1), and a diagonal element of the matrix is a numerator part $$\sum_{i=1}^{n} a_i^2$$

of formula (1).

A correlation coefficient between feature columns or between a feature column and the target column may be directly solved according to $A^T * A$. For example, a first correlation coefficient between the first feature column and the second feature column is $$\frac{991}{\sqrt{3582 * 326}} = 0.917,$$

and a second correlation coefficient between the second feature column and the target column is $$\frac{1}{\sqrt{326 * 1}} = 0.055.$$

In this way, a correlation coefficient matrix is obtained as follows. Because the matrix is symmetrical, and a diagonal element is 1, only an upper triangular or lower triangular part needs to be calculated. A finally obtained first correlation coefficient and second correlation coefficient may be shown in Table 9.

TABLE 9

|  | Age (first correlation coefficient) | On-net duration (first correlation coefficient) | Quantity of times of Internet accesses (first correlation coefficient) | Already off-net (second correlation coefficient) |
| --- | --- | --- | --- | --- |
| Age | 1 | 0.917 | 0.721 | 0.434 |
| On-net duration |  | 1 | 0.393 | 0.055 |
| Quantity of times of Internet accesses |  |  | 1 | 0.846 |
| Already off-net |  |  |  | 1 |

After the first correlation coefficient and the second correlation coefficient are obtained, K data columns are selected from the original data set, and specific implement manners are as follows.

In a first possible implementation manner clustering calculation is performed on any feature column in the original data set according to the first correlation coefficient between any two feature columns in the original data set, to obtain P clusters. A feature column that has a highest correlation with the target column is determined from each P clusters according to the second correlation coefficient between any feature column and the target column in the original data set, to obtain P feature columns, and K data columns are selected from the original data set according to the P feature columns and the target column.

In a specific implementation process, a clustering algorithm corresponding to the clustering calculation in this embodiment includes any one of a K-Means clustering algorithm, a hierarchical clustering algorithm, or a density clustering algorithm.

Values of P in different clustering algorithms are different. In the k-means clustering algorithm, P equals k−1. Input of the k-means clustering algorithm is a distance between two feature columns, and a distance between a feature column F1 and a feature column F2 may be defined as Dist(F1, F2)=1−Corr(F1, F2). That is, a distance between feature columns is shorter if a correlation is higher.

In a case in which a distance between two feature columns is known, a process of clustering the feature columns is as follows.

Step (a): Randomly select P feature columns from the original data set as clustering central vectors, where P=k−1.

Step (b): For each feature column F, compare a distance between F and K−1 clustering central vectors, and allocate F to a clustering central vector having a nearest distance with F. In this way, all feature columns are allocated to clusters corresponding to the K−1 clustering central vectors.

Step (c): For each cluster, solve a mean vector of vectors corresponding to all feature columns in the cluster, and then find a feature column nearest to the mean vector as a new clustering central vector. In this way, K−1 new clustering central vectors are obtained.

Step (d): Compare a distance between new and old clustering central vectors, if the distance is less than a preset threshold, finish the clustering, otherwise, repeat steps (a) to (d).

According to a result of feature column clustering, that a correlation between feature columns in a same cluster is high, and that a correlation between feature columns in different clusters is low can be ensured.

Then, a feature column is directly selected from each cluster, and in this cluster, a second correlation coefficient between the selected feature column and the target column is the highest. For example, when there are four clusters, and there are ten feature columns, a relationship between a quantity of feature columns in a cluster and a second correlation coefficient between a feature column and the target column is shown in Table 10.

TABLE 10

| Cluster identifier | Feature column identifier | Second correlation coefficient |
| --- | --- | --- |
| 1 | 1 | 0.5 |
|  | 3 | 0.4 |
| 2 | 9 | 0.1 |
|  | 2 | 0.3 |
|  | 6 | 0.05 |
|  | 5 | 0.7 |

TABLE 10-continued

| Cluster identifier | Feature column identifier | Second correlation coefficient |
|---|---|---|
| 3 | 10 | 0.4 |
|   | 4 | 0.9 |
|   | 7 | 0.35 |
| 4 | 8 | 0.6 |

One feature column that has a highest second correlation coefficient with the target column is selected from each cluster of the four clusters. For example, a second correlation coefficient 0.9 between a feature column 4 in a cluster 3 and the target column is the highest. Therefore, the feature column 4 is selected from the cluster 3, and finally, feature columns 1, 5, 4, and 8 are selected.

Therefore, the feature columns 1, 5, 4, and 8 and the target column are the K data columns selected from the original data set. Persons skilled in the art may understand that, the k-means clustering algorithm is used in this embodiment, and in a specific implementation process, another clustering algorithm may also be used, as long as the clustering algorithm can satisfy P=K−1. The clustering algorithm is not limited in this embodiment.

According to this embodiment, K data columns are selected from an original data set using a clustering algorithm, not only a maximum amount of data is met, but also data reliability is satisfied.

In a second possible implementation manner: in the hierarchical clustering algorithm and the density clustering algorithm, P is not equal to K−1. A feature column that has a highest correlation with the target column is determined according to the second correlation coefficient between any feature column and the target column in the original data set, to obtain P feature columns when P is greater than K−1. K−1 feature columns that have highest second correlation coefficients with the target column are selected in accordance with a descending sequence of correlations according to correlations between the P feature columns and the target column, where the K−1 feature columns and the target column are the K data columns selected from the original data set, The P feature columns are selected feature columns if P is not greater than K−1.

For example, in this embodiment, K=4, and K−1=3 feature columns need to be selected. P=4, that is, four clusters are obtained through second clustering calculation. A relationship between a quantity of feature columns in a cluster and a second correlation coefficient between a feature column and the target column may be shown in Table 9.

One feature column that has a highest second correlation coefficient with the target column is selected from each cluster of the four clusters. For example, a second correlation coefficient 0.9 between a feature column 4 in a cluster 3 and the target column is the highest. Therefore, the feature column 4 is selected from the cluster 3. A selection result of the manner may be shown in Table 11.

TABLE 11

| Feature column identifier | Second correlation coefficient |
|---|---|
| 1 | 0.5 |
| 5 | 0.7 |
| 4 | 0.9 |
| 8 | 0.6 |

The second correlation coefficients between the feature columns and the target column are sequenced in a descending sequence, sequenced second correlation coefficients are respectively 0.9, 0.7, 0.6, and 0.5, and corresponding feature column identifiers are respectively 4, 5, 8, and 1. Because K−1=3, a feature column 4, a feature column 5, a feature column 8 are selected, and finally, the target column and the feature column 4, the feature column 5, and the feature column 8 are the K data columns selected from the original data set.

According to this embodiment, K data columns are selected from an original data set using a clustering algorithm, not only a maximum amount of data is met, but also data reliability is satisfied.

Figure 5:
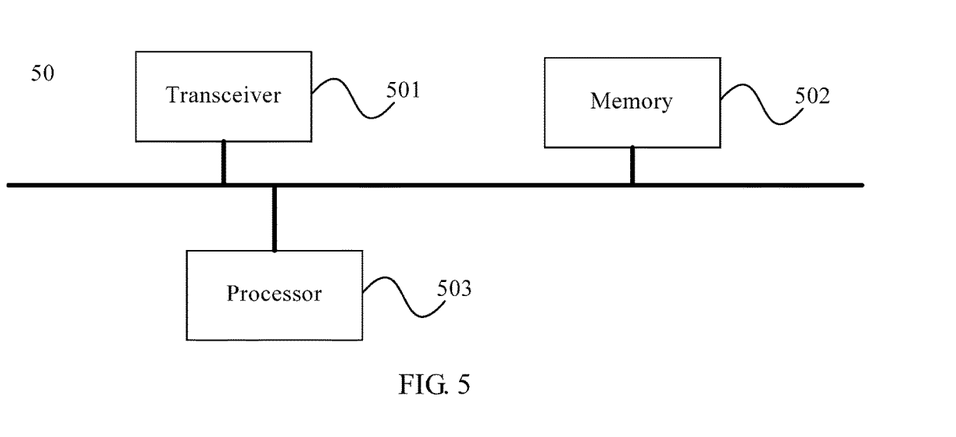
FIG. 5 is a structural apparatus diagram of Embodiment 1 of a data mining apparatus according to the present disclosure.

FIG. 5 is a structural apparatus diagram of Embodiment 1 of a data mining apparatus according to the present disclosure. This embodiment of the present disclosure further provides a data mining apparatus 50, where the apparatus 50 includes a transceiver 501, a processor 503, and a memory 502.

The transceiver 501 is configured to receive an original data set, and send to-be-processed input data obtained through extraction to each node for processing.

The memory 502 is configured to store the original data set.

The processor 503 is configured to determine multiple execution steps of a data mining process, acquire a correspondence between a physical resource required by each execution step in a running process and a physical resource occupied by input data of the data mining process, determine a node for executing each execution step, where the node provides a physical resource for each execution step, determine, according to the correspondence and a physical resource possessed by a node for executing a corresponding execution step, a maximum amount of data of the input data that can be processed by the node for executing each step, determine, according to the maximum amount of data of the input data that can be processed by the node for executing each step, a maximum amount of data of input data that can be processed by the distributed system, and process to-be-mined data in accordance with the data mining process according to the maximum amount of data of the input data that can be processed by the distributed system.

Preferably, the processor 503 is further configured to acquire the multiple execution steps for executing the data mining process, and analyze process data generated in the multiple execution steps, and combine an execution step in which the process data is generated with the execution step in which the process data is used as input into an optimized execution step when it is determined that there is one execution step in which the process data is used as input data, and the input data of the determined execution step does not include other process data except the process data.

Preferably, when the correspondence is represented as a ratio parameter, the processor is further configured to determine, for each execution step of the multiple execution steps, a ratio of all physical resources occupied by input data and output data of the execution step to the physical resource occupied by the input data of the data mining process when the execution step is running.

Preferably, when the execution step is an optimized execution step, and a physical resource occupied by temporary data generated in the optimized execution step is larger than input and/or output data of the optimized execution step, the processor 503 is further configured to perform summation calculation according to two larger ratios in three ratios of the physical resource occupied by the temporary data, a physical resource occupied by the input data of the optimized execution step, and a physical resource occupied by the output data of the optimized execution step respectively to the physical resource occupied by the input data of the data mining process, to obtain a ratio parameter of a physical resource required by the optimized execution step in a running process to the physical resource occupied by the input data of the data mining process.

Preferably, the processor 503 is further configured to screen one or more maximum amounts of data of an input data set can be allowed by each node, and use a minimum value of the one or more maximum amounts of data as the maximum amount of data of the input data that can be processed by the distributed system to run the data mining process.

Preferably, the processor 503 is further configured to determine, according to the maximum amount of data, a maximum quantity K of data columns selected from the to-be-mined data, where K is an integer, and select K data columns from the to-be-mined data, where the K data columns include K−1 feature columns and one target column.

Preferably, the processor 503 is further configured to perform clustering calculation on feature columns in the to-be-mined data, to obtain P clusters, and screen out K data columns from the P clusters according to a correlation between a feature column and the target column.

Further, the data mining apparatus 50 may be configured to complete implementation of various methods in the foregoing Embodiment 1 to Embodiment 3. Preferred properties in this embodiment are proposed for specific implementation involved in the method embodiments, and a one-to-one correspondence thereof is not described herein.

Persons of ordinary skill in the art may understand that all or some of the steps of the method embodiments may be implemented by a program instructing relevant hardware. The program may be stored in a computer-readable storage medium. When the program runs, the steps of the method embodiments are performed. The foregoing storage medium includes any medium that can store program code, such as a read-only memory (ROM), a random-access memory (RAM), a magnetic disk, or an optical disc.

Finally, it should be noted that the foregoing embodiments are merely intended for describing the technical solutions of the present disclosure, but not for limiting the present disclosure. Although the present disclosure is described in detail with reference to the foregoing embodiments, persons of ordinary skill in the art should understand that they may still make modifications to the technical solutions described in the foregoing embodiments or make equivalent replacements to some or all technical features thereof, without departing from the scope of the technical solutions of the embodiments of the present disclosure.

What is claimed is:

1. A data mining method, wherein the method is applied to a distributed system, wherein the distributed system comprises at least one node, and wherein the method comprises:
    determining multiple execution steps of a data mining process;
    acquiring a correspondence between a physical resource required by each execution step in a running process and a physical resource occupied by input data of the data mining process;
    determining a node for executing each execution step, wherein the node provides a physical resource for each execution step;
    determining, according to the correspondence and a physical resource possessed by a node for executing a corresponding execution step, a maximum amount of data of input data that is capable of being processed by the node for executing each execution step;
    determining, according to the maximum amount of data of the input data that is capable of being processed by the node for executing each execution step, a maximum amount of data of input data that is capable of being processed by the distributed system; and
    processing to-be-mined data in accordance with the data mining process according to the maximum amount of data of the input data that is capable of being processed by the distributed system,
    wherein when the execution step is an optimized execution step, and a physical resource occupied by process data generated in the optimized execution step is larger than a physical resource occupied by at least one of input data or output data of the optimized execution step, acquiring the correspondence comprises:
        determining two larger ratios in three ratios, wherein the three ratios comprise the physical resource occupied by the process data, the physical resource occupied by the input data of the optimized execution step, and the physical resource occupied by the output data of the optimized execution step respectively to the physical resource occupied by the input data of the data mining process; and
        performing summation calculation to obtain a ratio parameter of a physical resource required by the optimized execution step in the running process to the physical resource occupied by the input data of the data mining process.

2. The method according to claim 1, wherein determining the multiple execution steps of the data mining process comprises:
    acquiring the multiple execution steps for executing the data mining process;
    analyzing process data generated in the multiple execution steps; and
    combining an execution step in which the process data is generated with the execution step in which the process data is used as input data into an optimized execution step when there is one execution step in which the process data is used as the input data, and wherein the input data of the determined execution step does not comprise other process data except the process data.

3. The method according to claim 1, wherein determining the multiple execution steps of the data mining process further comprises:
    acquiring the multiple execution steps for executing the data mining process;
    analyzing the process data generated in the multiple execution steps; and
    combining the two or more than two execution steps when a single sample is processed each time in the two or more than two consecutive execution steps.

4. The method according to claim 1, wherein when the correspondence is represented as a ratio parameter, acquiring the correspondence comprises determining, for each execution step of the multiple execution steps, a ratio of all physical resources occupied by input data and output data of the execution step to the physical resource occupied by the input data of the data mining process when the execution step is running.

5. The method according to claim 1, wherein determining the maximum amount of the data of the input data that is capable of being processed by the distributed system comprises:

screening one or more maximum amounts of data of input data allowed by each node; and setting a minimum value of the one or more maximum amounts of data as the maximum amount of data of the input data that is capable of being processed by the distributed system running the data mining process.

6. The method according to claim 1, wherein processing the to-be-mined data in accordance with the data mining process according to the maximum amount of data further comprises:

determining, according to the maximum amount of data, a maximum quantity K of data columns selected from the to-be-mined data, wherein K is an integer; and selecting K data columns from the to-be-mined data, wherein the K data columns comprise K−1 feature columns and one target column.

7. The method according to claim 6, wherein selecting the K data columns from the to-be-mined data comprises:

performing clustering calculation on feature columns in the to-be-mined data, to obtain P clusters, wherein P is an integer; and screening out K data columns from the P clusters according to a correlation between a feature column and the target column.

8. The method according to claim 7, wherein a clustering algorithm corresponding to the clustering calculation comprises a K-Means clustering algorithm.

9. The method according to claim 7, wherein a clustering algorithm corresponding to the clustering calculation comprises a hierarchical clustering algorithm.

10. The method according to claim 7, wherein a clustering algorithm corresponding to the clustering calculation comprises a density clustering algorithm.

11. The method according to claim 1, wherein the physical resource comprises a memory resource.

12. The method according to claim 1, wherein the physical resource comprises at least one of a hard disk resource or a processor core resource.

13. A data mining apparatus, wherein the apparatus is applied to a distributed system, wherein the distributed system comprises at least one node, and wherein the apparatus comprises:

a transceiver configured to:
receive an original data set; and
send to-be-processed input data obtained through extraction to each node for processing:

a memory coupled to the transceiver and configured to store the original data set; and a processor coupled to the transceiver and memory, wherein the processor is configured to:

determine multiple execution steps of a data mining process;

acquire a correspondence between a physical resource required by each execution step in a running process and a physical resource occupied by input data of the data mining process;

determine a node for executing each execution step, wherein the node provides a physical resource for each execution step;

determine, according to the correspondence and a physical resource possessed by a node for executing a corresponding execution step, a maximum amount of data of the input data that is capable of being processed by the node for executing each execution step;

determine, according to the maximum amount of data of the input data that is capable of being processed by the node for executing each execution step, a maximum amount of data of input data that is capable of being processed by the distributed system; and process to-be-mined data in accordance with the data mining process according to the maximum amount of data of the input data that is capable of being processed by the distributed system, wherein when the execution step is an optimized execution step, and a physical resource occupied by temporary data generated in the optimized execution step is larger than a physical resource occupied by at least one of input or output data of the optimized execution step, the processor is further configured to perform summation calculation according to two larger ratios in three ratios, wherein the three ratios comprise the physical resource occupied by the temporary data, the physical resource occupied by the input data of the optimized execution step, and the physical resource occupied by the output data of the optimized execution step respectively to the physical resource occupied by the input data of the data mining process, to obtain a ratio parameter of a physical resource required by the optimized execution step in a running process to the physical resource occupied by the input data of the data mining process.

14. The apparatus according to claim 13, wherein the processor is further configured to:

acquire the multiple execution steps for executing the data mining process;

analyze process data generated in the multiple execution steps; and combine an execution step in which the process data is generated with the execution step in which the process data is used as input data into an optimized execution step when there is one execution step in which the process data is used as the input data, and wherein the input data of the determined execution step does not comprise other process data except the process data.

15. The apparatus according to claim 13, wherein when the correspondence is represented as a ratio parameter, the processor is further configured to determine, for each execution step of the multiple execution steps, a ratio of all physical resources occupied by input data and output data of the execution step to the physical resource occupied by the input data of the data mining process when the execution step is running.

16. The apparatus according to claim 13, wherein the processor is further configured to:

screen one or more maximum amounts of data of input data allowed by each node; and set a minimum value of the one or more maximum amounts of data as the maximum amount of data of the input data that is capable of being processed by the distributed system to run the data mining process.

17. The apparatus according to claim 13, wherein the processor is further configured to:

determine, according to the maximum amount of data, a maximum quantity K of data columns selected from the to-be-mined data, wherein K is an integer; and select K data columns from the to-be-mined data, wherein the K data columns comprise K−1 feature columns and one target column.

18. The apparatus according to claim 17, wherein the processor is further configured to:

perform clustering calculation on feature columns in the to-be-mined data, to obtain P clusters, wherein P is an integer; and screen out the K data columns from the P clusters according to a correlation between a feature column and the target column.

\* \* \* \* \*